(12) United States Patent
Sasaki et al.

(10) Patent No.: US 11,149,847 B2
(45) Date of Patent: Oct. 19, 2021

(54) AUTOMATIC TRANSMISSION POWER TRANSMISSION DEVICE

(71) Applicant: Mazda Motor Corporation, Hiroshima (JP)

(72) Inventors: Masanori Sasaki, Hiroshima (JP); Masamichi Fujikawa, Hatsukaichi (JP); Kazuhiro Yamada, Hiroshima (JP); Kensuke Ueda, Aki-gun (JP); Sayaka Katayama, Hiroshima (JP); Yasuo Miura, Hiroshima (JP); Takeyuki Tanaka, Hiroshima (JP); Hirokazu Kouno, Hiroshima (JP); Takashi Miyamoto, Hiroshima (JP); Ryohei Hanamure, Hiroshima (JP); Siyuan Tao, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/768,864

(22) PCT Filed: Nov. 13, 2018

(86) PCT No.: PCT/JP2018/041888
§ 371 (c)(1),
(2) Date: Jun. 1, 2020

(87) PCT Pub. No.: WO2019/111640
PCT Pub. Date: Jun. 13, 2019

(65) Prior Publication Data
US 2021/0048103 A1 Feb. 18, 2021

(30) Foreign Application Priority Data

Dec. 8, 2017 (JP) .............................. JP2017-235730

(51) Int. Cl.
*F16H 63/30* (2006.01)
*F16D 55/36* (2006.01)
(Continued)

(52) U.S. Cl.
CPC .............. *F16H 63/30* (2013.01); *F16D 55/36* (2013.01); *F16D 65/12* (2013.01); *F16H 3/66* (2013.01);
(Continued)

(58) Field of Classification Search
CPC . F16H 63/30; F16H 3/66; F16H 57/10; F16H 2063/3093; F16H 2200/006;
(Continued)

(56) References Cited

U.S. PATENT DOCUMENTS

2001/0039229 A1\* 11/2001 Sulzmann ........... F16H 63/3026
475/317
2006/0264297 A1\* 11/2006 Seki ...................... F16D 13/683
475/324
(Continued)

FOREIGN PATENT DOCUMENTS

JP 2002-039270 A 2/2002
JP 2002-130322 A 5/2002
(Continued)

*Primary Examiner* — Tisha D Lewis
(74) *Attorney, Agent, or Firm* — Alleman Hall Creasman & Tuttle LLP

(57) ABSTRACT

A power transmission device in an automatic transmission includes a friction tightening element (a second brake) having a drum member, and a transmission path constituent member (a third ring gear) coupled to the drum member via a coupling part extending circumferentially along the drum member, the drum member having low-rigidity parts (long holes) provided at a plurality of circumferential positions on the drum member in at least one of portions radially outside and inside the coupling part.

6 Claims, 6 Drawing Sheets

(51) Int. Cl.
*F16D 65/12* (2006.01)
*F16H 3/66* (2006.01)
*F16H 57/10* (2006.01)
*F16D 13/52* (2006.01)
*F16D 25/0638* (2006.01)
*F16D 121/04* (2012.01)

(52) U.S. Cl.
CPC ............. *F16H 57/10* (2013.01); *F16D 13/52* (2013.01); *F16D 25/0638* (2013.01); *F16D 2121/04* (2013.01); *F16H 2063/3093* (2013.01); *F16H 2200/006* (2013.01); *F16H 2200/2012* (2013.01); *F16H 2200/2043* (2013.01)

(58) Field of Classification Search
CPC ..... F16H 2200/2012; F16H 2200/2043; F16D 55/36; F16D 65/12; F16D 13/52; F16D 25/0638; F16D 2121/04
See application file for complete search history.

(56) References Cited

U.S. PATENT DOCUMENTS

2010/0083780 A1\* 4/2010 Szuba .................... F16D 65/10
74/411.5
2016/0298759 A1\* 10/2016 Saji ...................... F16H 61/0276
2017/0284516 A1 10/2017 Kamada et al.

FOREIGN PATENT DOCUMENTS

| JP | 2008-025642 A | 2/2008 |
| JP | 2018-059530 A | 4/2018 |
| WO | 2016063857 A1 | 4/2016 |

\* cited by examiner

FIG.2

|  | FIRST CLUTCH | SECOND CLUTCH | THIRD CLUTCH | FIRST BRAKE | SECOND BRAKE |
|---|---|---|---|---|---|
| FIRST GEAR | ○ |  |  | ○ | ○ |
| SECOND GEAR |  | ○ |  | ○ | ○ |
| THIRD GEAR | ○ | ○ |  |  | ○ |
| FOURTH GEAR |  | ○ | ○ |  | ○ |
| FIFTH GEAR | ○ |  | ○ |  | ○ |
| SIXTH GEAR | ○ | ○ | ○ |  |  |
| SEVENTH GEAR | ○ |  | ○ | ○ |  |
| EIGHTH GEAR |  | ○ | ○ | ○ |  |
| REVERSE GEAR |  |  | ○ | ○ | ○ |

← FRONT    REAR →

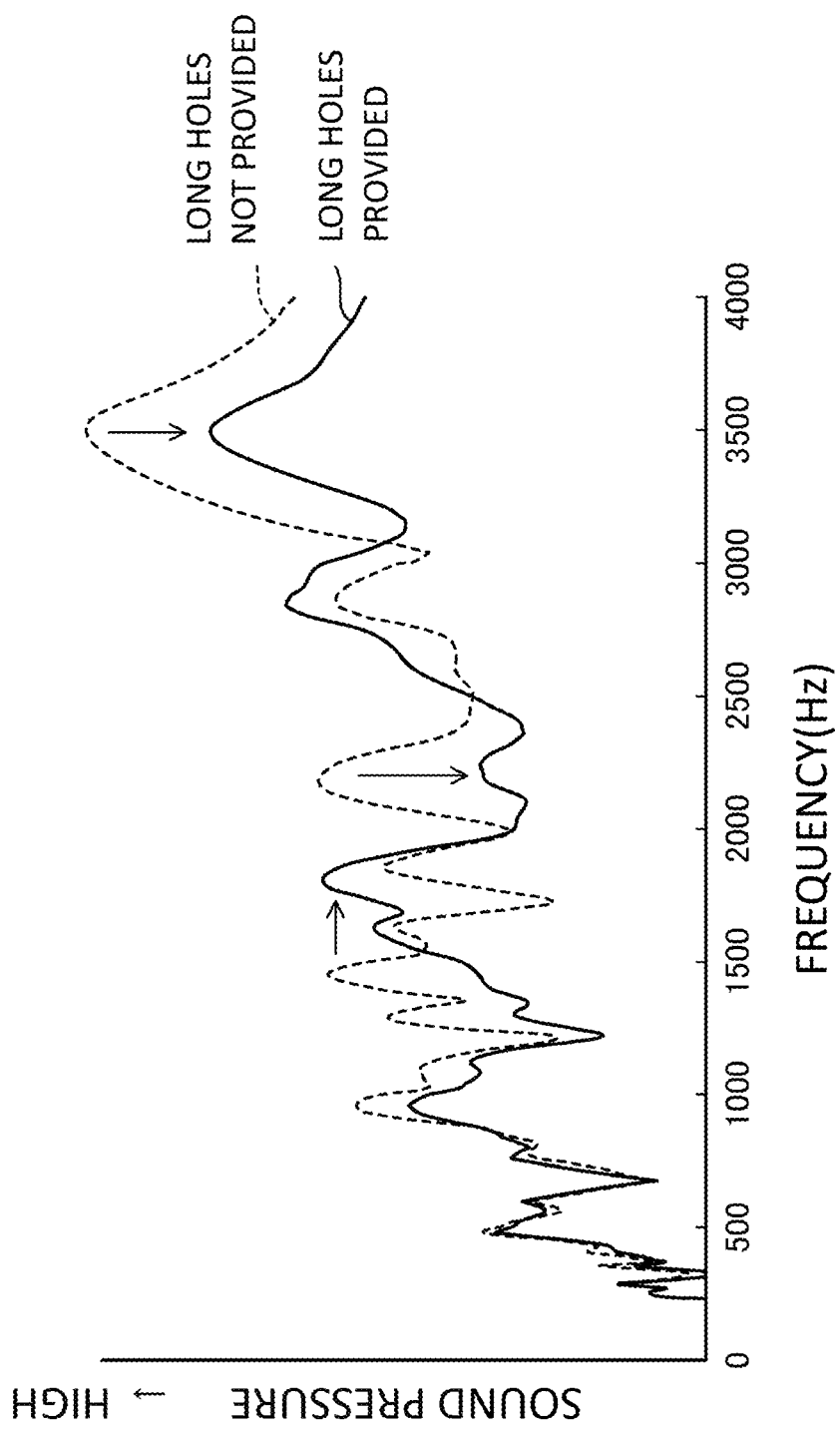

AUTOMATIC TRANSMISSION POWER TRANSMISSION DEVICE

TECHNICAL FIELD

The present invention relates to an automatic transmission power transmission device.

BACKGROUND ART

An automatic transmission power transmission device mounted on a vehicle such as an automobile typically includes a friction tightening element (a brake or a clutch). Patent Document 1 discloses an automatic transmission including a damper having a mass part in an annular shape, a plurality of elastic parts extending radially inward from the annular mass part, and a plurality of frictional parts extending radially and integrally from intermediate portions of the elastic parts adjacent to each other in the mass part. The damper is attached to a clutch hub with an elastic member interposed therebetween, the mass part vibrates equally in phase to the clutch hub, and friction is generated between the clutch hub and a frictional member stuck to each of the frictional parts to damp vibration of the clutch hub.

CITATION LIST

Patent Document

PATENT DOCUMENT 1: Japanese Unexamined Patent Publication No. 2002-39270

SUMMARY OF THE INVENTION

Technical Problem

The friction tightening element of the automatic transmission includes a drum member provided radially outside the hub, and the hub is provided with a plurality of friction plates that engages with a plurality of friction plates attached to the drum member to tighten the friction tightening element. The drum member is coupled to a transmission path constituent member (e.g. one rotary element in one of a plurality of planetary gear sets included in the automatic transmission) constituting part of a power transmission path of the automatic transmission.

In a specific case where the transmission path constituent member coupled to the drum member is a gear (e.g. a ring gear or a sun gear of the planetary gear set), the gear meshes with a different gear to generate vibration transmitted to the drum member. The vibration transmitted to the drum member is transmitted to a transmission case along with vibration of a different member in the transmission case through various members in the transmission case, and is then to be transmitted to a vehicle interior through a vehicle body member supporting the transmission case.

In a specific case where the friction tightening element is a brake, the drum member of the brake is fixed to the transmission case when the brake is tightened, so that vibration transmitted from the transmission path constituent member to the drum member is transmitted to the transmission case through the friction plates. The drum member of the brake is typically positioned adjacent to the transmission case, so that the vibration transmitted from the transmission path constituent member to the drum member generates sound radiation that vibrates the transmission case through air.

In view of this, the drum member (specifically the drum member of the brake) coupled to the transmission path constituent member may be attached to the damper as disclosed in Patent Document 1 to damp vibration of the drum member.

Such a configuration of the drum member attached to the damper as disclosed in Patent Document 1 leads to weight increase as well as cost increase of the drum member including the transmission path constituent member. The configuration may still be improved for more weight reduction and inhibition of cost increase of the automatic transmission.

In view of the foregoing background, it is an object of the present invention to provide an automatic transmission power transmission device that achieves weight reduction and inhibition of cost increase of a drum member coupled to a transmission path constituent member, and also achieves vibration reduction at the drum member.

Solution to the Problem

In order to achieve the above object, the present invention provides an automatic transmission power transmission device to be described hereinafter. In the power transmission device in an automatic transmission, the automatic transmission includes: a friction tightening element including a drum member; and a transmission path constituent member coupled to the drum member via a coupling part extending circumferentially along the drum member, and constituting part of a power transmission path of the automatic transmission. The drum member has low-rigidity parts provided at a plurality of circumferential positions on the drum member in at least one of portions radially outside and inside the coupling part.

The above configuration achieves vibration damping at the low-rigidity parts in the drum member having received vibration generated at the transmission path constituent member. This reduces vibration of the drum member as well as vibration and noise generated in a vehicle interior due to vibration of an entire transmission case. The low-rigidity parts can each be constituted by a through hole, a groove, or the like, to achieve weight reduction as well as inhibition of cost increase of the drum member. The vibration of the drum member has a natural frequency that can be set to a desired value not by applying a damper but by adjusting the number of through holes or grooves provided circumferentially along the drum member, size of the holes or the grooves, depth of the grooves, or the like.

In the power transmission device in the automatic transmission according to an embodiment, the friction tightening element is a brake configured to fix the transmission path constituent member to a transmission case when the friction tightening element is tightened.

Vibration transmitted from the transmission path constituent member to the drum member is transmitted to the transmission case through a friction plate when the brake is tightened, so that the entire transmission case is likely to have large vibration. Even when the brake including the drum member provided with the low-rigidity parts is tightened, vibration reduction at the drum member leads to vibration reduction at the entire transmission case, for reduction of vibration and noise generated in the vehicle interior due to the vibration of the entire transmission case.

In to the embodiment with the friction tightening element provided as the brake, the transmission path constituent member may be a ring gear in a planetary gear set, and the coupling part may be a welding coupling part.

When the transmission path constituent member is a ring gear having a large diameter, the transmission path constituent member is likely to have large vibration that is transmitted to the drum member through the welding coupling part with almost no vibration damping. However, the low-rigidity parts provided at the drum member lead to vibration damping at the low-rigidity parts in the drum member. This reduces vibration of the drum member as well as vibration and noise generated in the vehicle interior due to vibration of the entire transmission case.

In the power transmission device in the automatic transmission according to another embodiment, the automatic transmission is directly connected to a driving source without via any torque converter, and the friction tightening element is a vehicle start friction tightening element configured to be tightened when a vehicle mounting the automatic transmission starts.

The vehicle start friction tightening element is brought into a slip state and then into a completely tightened state upon vehicle start. The drum member is likely to have large vibration when the vehicle start friction tightening element is in the slip state. Furthermore, the vibration of the drum member is likely to be transmitted to the transmission case through the friction plate. However, when the drum member is provided with the low-rigidity parts, vibration reduction at the drum member upon vehicle start leads to vibration reduction at the entire transmission case, for reduction of vibration and noise generated in the vehicle interior due to the vibration of the entire transmission case.

Advantages of the Invention

As described above, in the automatic transmission power transmission device according to the present invention, the drum member of the friction tightening element has the low-rigidity parts provided at the plurality of circumferential positions on the drum member in at least one of portions radially outside and inside the coupling part. This configuration achieves weight reduction and inhibition of cost increase of the drum member coupled to the transmission path constituent member, as well as vibration reduction at the drum member. Furthermore, the vibration of the drum member has a natural frequency that can be set to a desired value.

BRIEF DESCRIPTION OF THE DRAWINGS

FIG. 2 is a tightening chart indicating tightened states of friction tightening elements at each variable gear of the automatic transmission.

FIG. 7 is a graph indicating frequency characteristics of sound generated in a vehicle interior by vibration of an entire transmission case in each of a case where the drum member has a long hole and another case where the drum member has no long hole.

DESCRIPTION OF EMBODIMENT

An exemplary embodiment will now be described in detail hereinafter with reference to the drawings.

Figure 1:
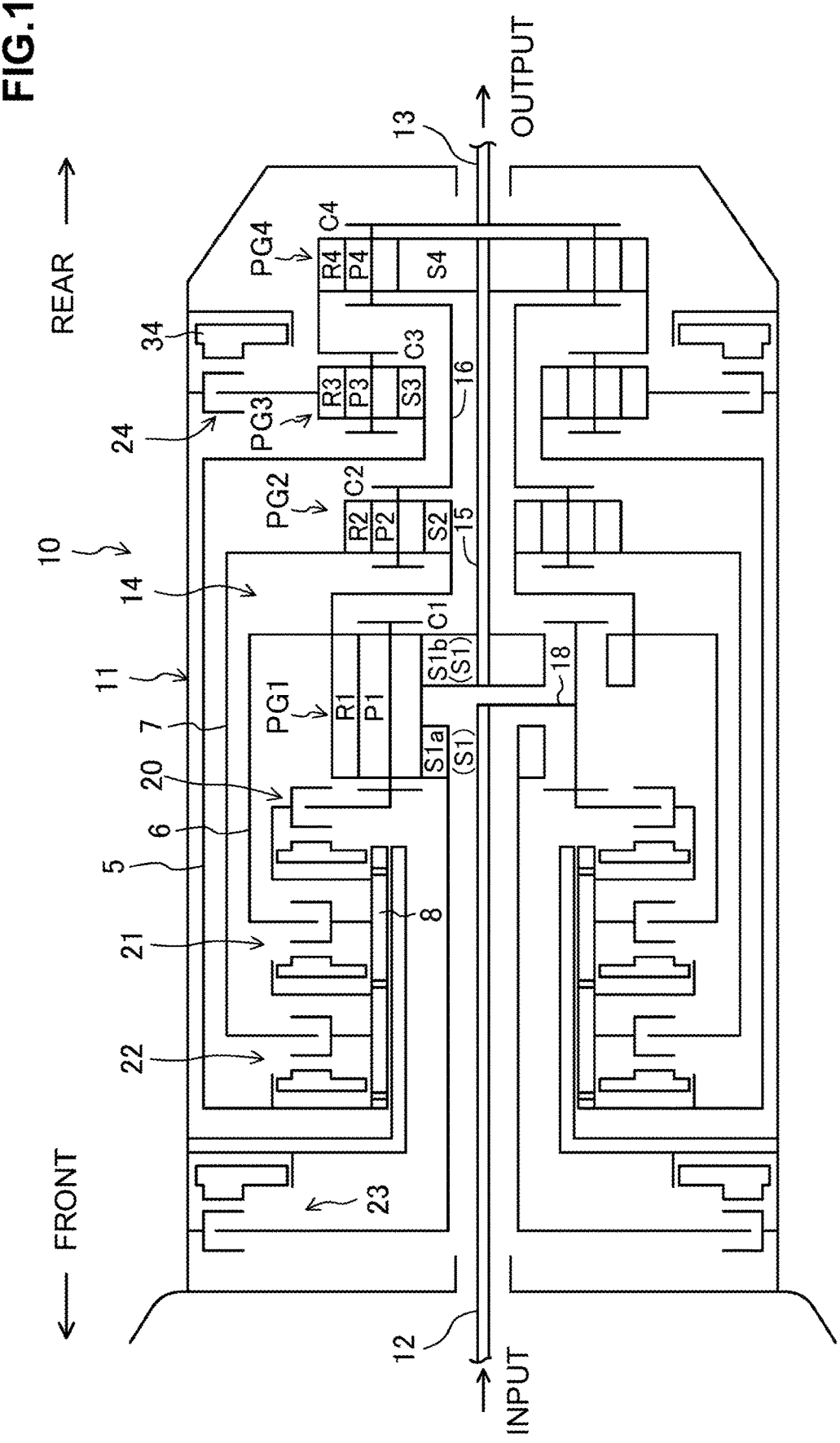
FIG. 1 is a schematic diagram exemplarily depicting an automatic transmission including a power transmission device according to an exemplary embodiment.

FIG. 1 exemplarily depicts an automatic transmission 10 including a power transmission device according to the exemplary embodiment. The automatic transmission 10 is vertically mounted on a front-engine rear-drive vehicle.

The automatic transmission 10 includes a transmission case 11, an input shaft 12 inserted to the transmission case 11 and configured to receive power from a driving source (e.g. an engine or a motor) of the vehicle, a transmission mechanism 14 accommodated in the transmission case 11 and configured to receive the power from the driving source through the input shaft 12, and an output shaft 13 inserted to the transmission case 11 and configured to output the power from the transmission mechanism 14 to a propeller shaft.

The automatic transmission 10 is directly connected to the driving source without via any torque converter. The input shaft 12 is thus directly connected to an output shaft of the driving source.

The input shaft 12 and the output shaft 13 are disposed coaxially in a vehicle front-rear direction such that the input shaft 12 is positioned adjacent to a vehicle front end and the output shaft 13 is positioned adjacent to a vehicle rear end in a state where the automatic transmission 10 is mounted on the vehicle. In the following description, an end adjacent to the driving source (a left end in FIG. 1) in an axial direction of the input shaft 12 (an axial direction of the output shaft 13) will be called a front end whereas an end far from the driving source (a right end in FIG. 1) in the axial direction of the input shaft 12 will be called a rear end.

The transmission mechanism 14 includes a first planetary gear set PG1 (hereinafter, referred to as a first gear set PG1), a second planetary gear set PG2 (hereinafter, referred to as a second gear set PG2), a third planetary gear set PG3 (hereinafter, referred to as a third gear set PG3), and a fourth planetary gear set PG4 (hereinafter, referred to as a fourth gear set PG4), which are aligned axially along the input shaft 12. The first gear set PG1, the second gear set PG2, the third gear set PG3, and the fourth gear set PG4 are aligned in the mentioned order from the front end, and constitute a plurality of power transmission paths from the input shaft 12 to the output shaft 13. The first to fourth gear sets PG1 to PG4 are disposed coaxially with the input shaft 12 and the output shaft 13.

The first gear set PG1 includes rotary elements, specifically, a first sun gear S1, a first ring gear R1, and a first carrier C1. The first gear set PG1 is of a single pinion type, and a plurality of pinions P1, which is supported by the first carrier C1 and is disposed circumferentially along the first gear set PG1 so as to be spaced apart from each other, meshes with both the first sun gear S1 and the first ring gear R1.

The second gear set PG2 includes rotary elements, specifically, a second sun gear S2, a second ring gear R2, and a second carrier C2. The second gear set PG2 is also of the single pinion type, and a plurality of pinions P2, which is supported by the second carrier C2 and is disposed circumferentially along the second gear set PG2 so as to be spaced apart from each other, meshes with both the second sun gear S2 and the second ring gear R2.

The third gear set PG3 includes rotary elements, specifically, a third sun gear S3, a third ring gear R3, and a third carrier C3. The third gear set PG3 is also of the single pinion type, and a plurality of pinions P3, which is supported by the third carrier C3 and is disposed circumferentially along the third gear set PG3 so as to be spaced apart from each other, meshes with both the third sun gear S3 and the third ring gear R3.

The fourth gear set PG4 includes rotary elements, specifically, a fourth sun gear S4, a fourth ring gear R4, and a fourth carrier C4. The fourth gear set PG4 is also of the single pinion type, and a plurality of pinions P4, which is supported by the fourth carrier C4 and is disposed circumferentially along the fourth gear set PG4 so as to be spaced apart from each other, meshes with both the fourth sun gear S4 and the fourth ring gear R4.

The first sun gear S1 of the first gear set PG1 is divided into two portions axially along the input shaft 12, specifically, a front first sun gear S1a disposed relatively ahead and a rear first sun gear S1b disposed relatively behind. The first gear set PG1 is accordingly of a double sun gear type. The front and rear first sun gears S1a and S1b each have an equal number of teeth and each mesh with the pinions P1 supported by the first carrier C1, so as to have a constantly equal rotational number. Specifically, the front and rear first sun gears S1a and S1b rotate at constantly equal rotational speed. When one of the gears stops rotation, another one also stops rotation.

The first sun gear S1 (exactly the rear first sun gear S1b) and the fourth sun gear S4 are constantly coupled to each other, the first ring gear R1 and the second sun gear S2 are constantly coupled to each other, the second carrier C2 and the fourth carrier C4 are constantly coupled to each other, and the third carrier C3 and the fourth ring gear R4 are constantly coupled to each other. The input shaft 12 is constantly coupled to the first carrier C1, whereas the output shaft 13 is constantly coupled to the fourth carrier C4. Specifically, the input shaft 12 is coupled to the first carrier C1 via a power transmission member 18 extending between the front and rear first sun gears S1a and S1b. The rear first sun gear S1b and the fourth sun gear S4 are coupled via a power transmission shaft 15. The second carrier C2 and the fourth carrier C4 are coupled via a power transmission member 16.

The transmission mechanism 14 further includes five friction tightening elements (a first clutch 20, a second clutch 21, a third clutch 22, a first brake 23, and a second brake 24) configured to select one of the plurality of power transmission paths constituted by the first to fourth gear sets PG1 to PG4 to switch among the power transmission paths.

The first clutch 20 is configured to disengage the input shaft 12 and the first carrier C1 from the third sun gear S3. The first clutch 20 is provided ahead of the first gear set PG1.

The second clutch 21 is configured to disengage the first ring gear R1 and the second sun gear S2 from the third sun gear S3. The second clutch 21 is provided ahead of the first clutch 20.

The third clutch 22 is configured to disengage the second ring gear R2 from the third sun gear S3. The third clutch 22 is provided ahead of the second clutch 21.

The third sun gear S3 is coupled to all the first clutch 20, the second clutch 21, and the third clutch 22 via a coupling member 5 and a coupling member 8. The first ring gear R1 and the second sun gear S2 are coupled to the second clutch 21 via a drum member 6 included in the second clutch 21, and the second ring gear R2 and the third clutch 22 are coupled via a drum member 7 included in the third clutch 22.

The first brake 23 is configured to disengage the first sun gear S1 (exactly the front first sun gear S1a) from the transmission case 11. The first brake 23 is disposed adjacent to the transmission case 11 ahead of the third clutch 22. The first sun gear S1 is fixed to the transmission case 11 when the first brake 23 is tightened.

The second brake 24 is configured to disengage the third ring gear R3 from the transmission case 11. The third ring gear R3 is fixed to the transmission case 11 when the second brake 24 is tightened.

Each of the friction tightening elements is tightened through supply of hydraulic oil to a tightening oil pressure chamber provided in a corresponding one of the friction tightening elements. As indicated in a tightening chart in FIG. 2, three out of the five friction tightening elements are selectively tightened to achieve one of first to eight gears for forward travel and a reverse gear. The tightening chart in FIG. 2 includes columns each filled with a circle indicating a state where a corresponding one of the friction tightening elements is tightened, and blank columns each indicating a state where a corresponding one of the friction tightening elements is untightened (released).

Specifically, the first clutch 20, the first brake 23, and the second brake 24 are tightened to achieve the first gear. The second clutch 21, the first brake 23, and the second brake 24 are tightened to achieve the second gear. The first clutch 20, the second clutch 21, and the second brake 24 are tightened to achieve the third gear. The second clutch 21, the third clutch 22, and the second brake 24 are tightened to achieve the fourth gear. The first clutch 20, the third clutch 22, and the second brake 24 are tightened to achieve the fifth gear. The first clutch 20, the second clutch 21, and the third clutch 22 are tightened to achieve the sixth gear. The first clutch 20, the third clutch 22, and the first brake 23 are tightened to achieve the seventh gear. The second clutch 21, the third clutch 22, and the first brake 23 are tightened to achieve the eighth gear. The third clutch 22, the first brake 23, and the second brake 24 are tightened to achieve the reverse gear. At the sixth gear, the input shaft 12 and the output shaft 13 are equal in rotational speed.

Figure 3:
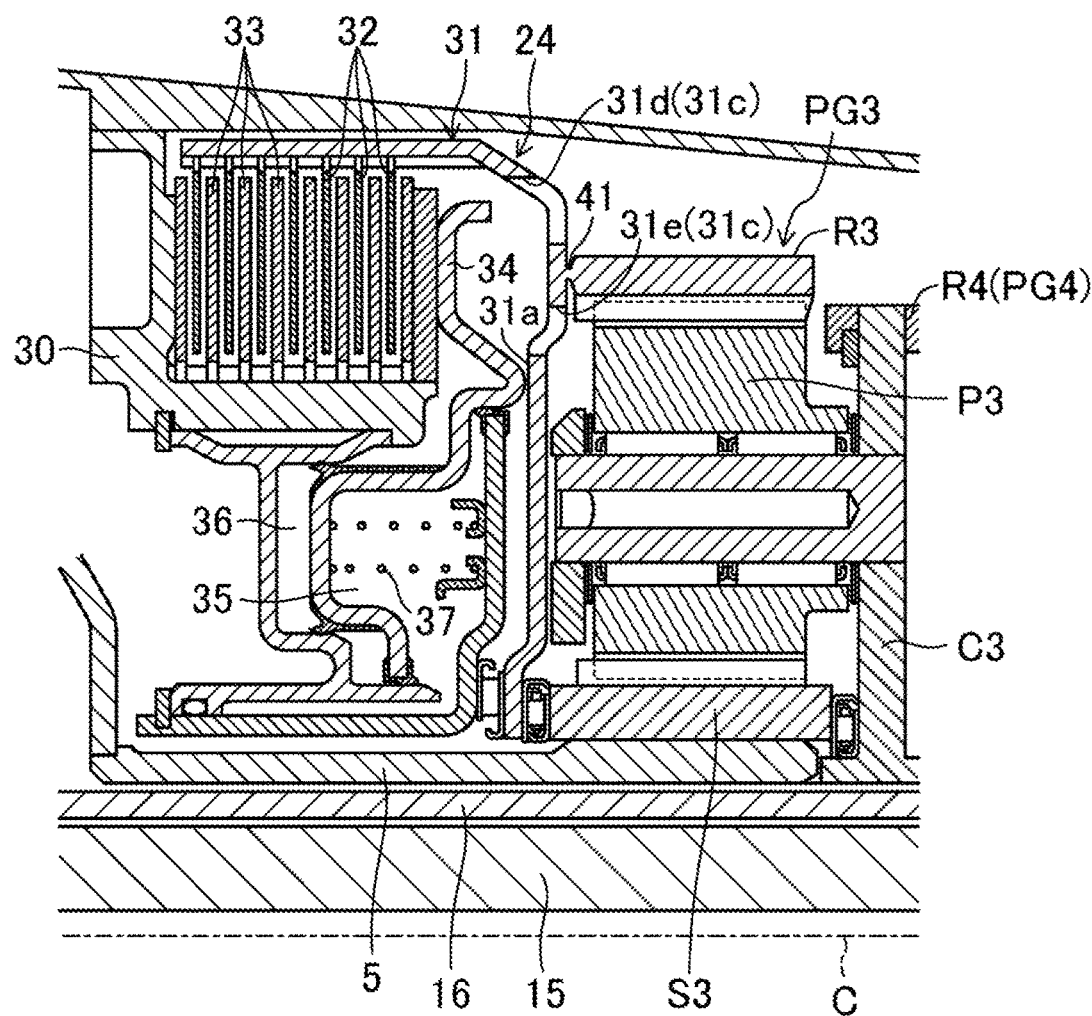
FIG. 3 is a sectional view exemplarily depicting a specific configuration of the power transmission device.

FIG. 3 exemplarily depicts a specific configuration of the power transmission device according to the present embodiment. The power transmission device includes the second brake 24 functioning as a friction tightening element, and the third ring gear R3 functioning as a transmission path constituent member constituting part of the power transmission paths of the automatic transmission 10.

Figure 4:
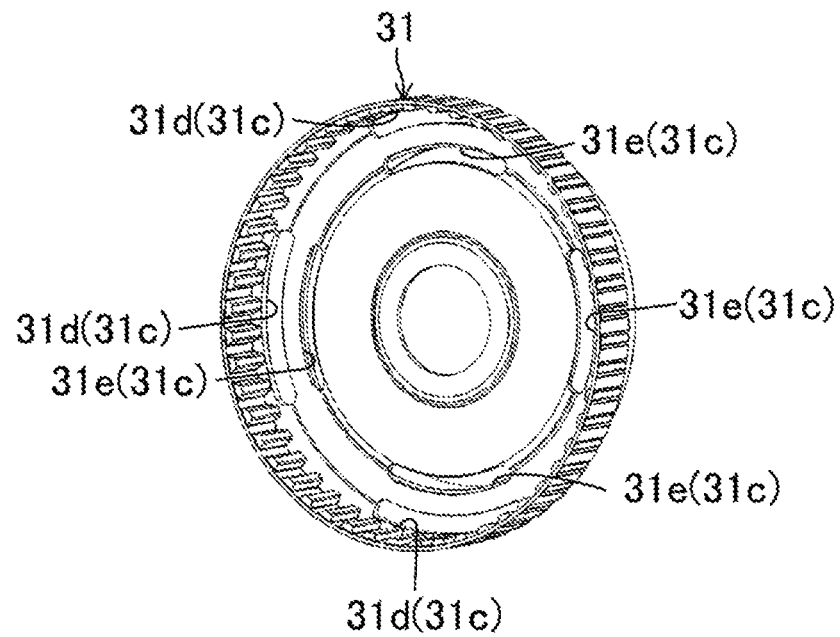
FIG. 4 is a perspective view of a drum member included in a second brake and coupled to a third ring gear.

The second brake 24 includes a drum member 31 having a bottomed cylindrical shape opened forward. The drum member 31 has an outer circumferential surface positioned adjacent to the transmission case 11. The drum member 31 includes a bottom 31a having a center provided with a through hole 31b (see FIG. 4 to FIG. 6) penetrated by the coupling member 5 and the power transmission shafts 15 and 16. FIG. 3 includes reference character C indicating a center axis of the input shaft 12 (a center axis of the output shaft 13) also serving as a center axis of the drum member 31. The drum member 31 has an axial direction matching the axial direction of the input shaft 12 (the axial direction of the output shaft 13).

The drum member 31 has an inner circumferential surface provided with a plurality of friction plates 32. When the second brake 24 is tightened, these friction plates 32 engage with a plurality of friction plates 33 attached such that the friction plates 32 and the friction plates 33 are aligned alternately at a fixing member 30 (hub) fixed to the transmission case 11 and positioned radially inside the drum member 31. Though not depicted, the fixing member 30 has a portion provided with the friction plates 33 and having an opening communicating with an oil passage extending from the center axis C. The friction plates 32 and 33 are supplied with a lubricant through the oil passage. The oil passage and the opening are positioned radially inside the friction plates 32 and 33 that can thus be smoothly supplied with a large amount of lubricant (such a large amount of lubricant is necessary in the slip state as to be described later) due to centrifugal force.

The second brake 24 further includes a piston 34, a tightening oil pressure chamber 35 and releasing oil pressure chamber 36 provided to interpose the piston 34 therebetween, and a spring 37. When the second brake 24 is tightened, the piston 34 presses, axially along the drum member 31, the friction plates 32 and the friction plates 33 to be engaged with each other by hydraulic oil supplied to the tightening oil pressure chamber 35. The spring 37 is provided in the tightening oil pressure chamber 35, and biases the piston 34 with biasing force enough to cause the friction plates 32 and the friction plates 33 to come into contact with each other when neither the tightening oil pressure chamber 35 nor the releasing oil pressure chamber 36 is supplied with hydraulic oil.

The second brake 24 functions as a vehicle start friction tightening element (vehicle start brake) configured to be tightened when the vehicle starts. Specifically, a tightening oil pressure chamber 35 of a second brake BR2 is supplied with hydraulic oil in a state where a first clutch CL1 and a first brake BR1 are tightened upon vehicle start, so that the second brake BR2 transitions from the state where the friction plates 32 and the friction plates 33 are in contact with each other into a completely tightened state through the slip state. The friction plates 32 and the friction plates 33 slide with each other when the second brake 24 is in the slip state. In the second brake 24 being untightened, the tightening oil pressure chamber 35 of the second brake 24 is not supplied with hydraulic oil whereas the releasing oil pressure chamber 36 is supplied with hydraulic oil.

The drum member 31 is provided therebehind with the third gear set PG3. The drum member 31 is larger in outer diameter than the third ring gear R3 of the third gear set PG3. The drum member 31 and the third ring gear R3 are both made of metal.

Figure 5:
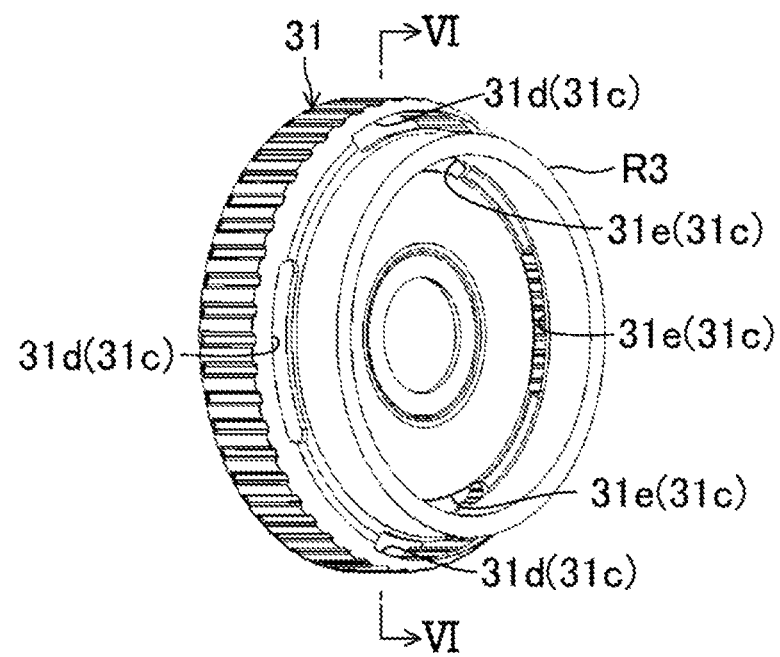
FIG. 5 is a perspective view of the drum member in a direction different from a direction of FIG. 4.
Figure 6:
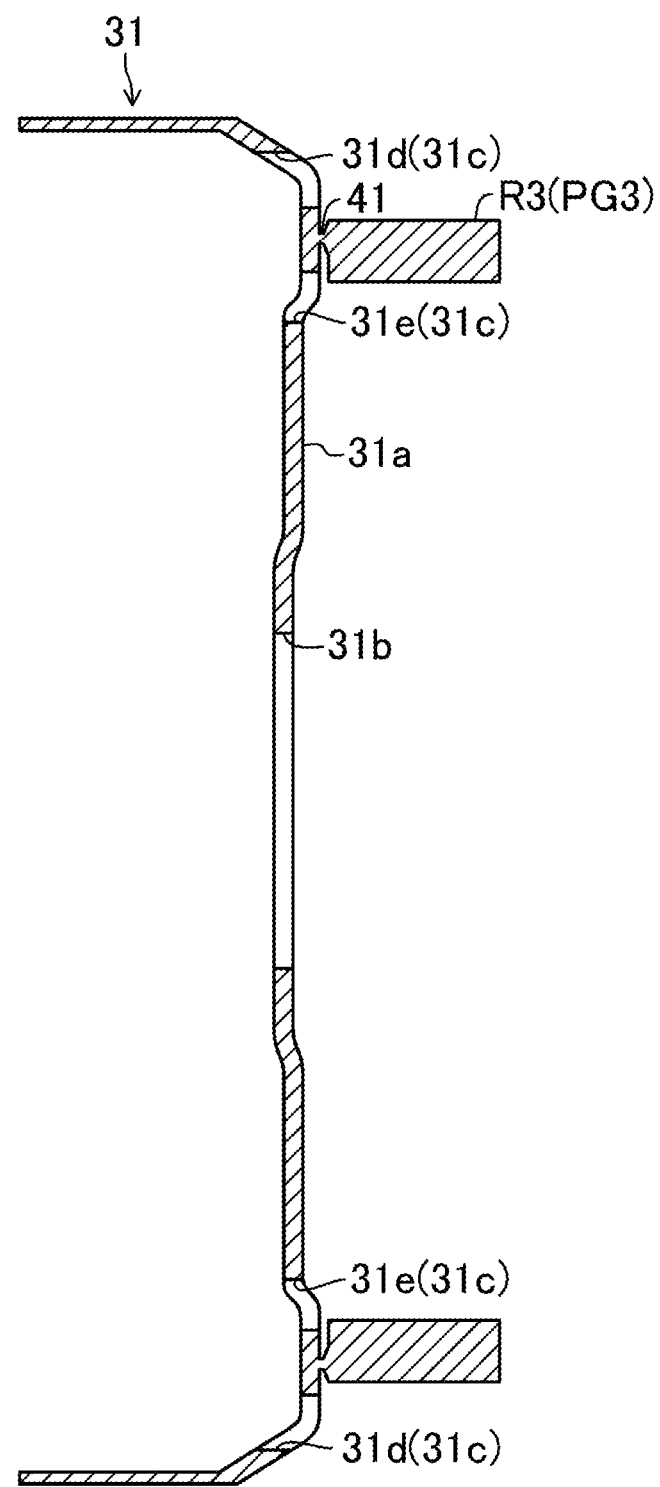
FIG. 6 is a sectional view taken along line VI-VI indicated in FIG. 5.

As depicted in FIG. 3, FIG. 5, and FIG. 6, the third ring gear R3 is coupled to the bottom 31a of the drum member 31 via a coupling part 41 extending circumferentially along the drum member 31. FIG. 5 and FIG. 6 do not depict teeth of the third ring gear R3.

The coupling part 41 according to the present embodiment is provided as a projection welding coupling part. Specifically, the coupling part 41 is constituted by a projection having a ring shape and extending toward a front surface of the third ring gear R3, and the third ring gear R3 is projection-welded to a rear surface of the bottom 31a of the drum member 31 via the projection. The coupling part 41 according to the present embodiment is provided along an entire circumference of the drum member 31 (an entire circumference of the third ring gear R3) at an outer circumferential portion of the rear surface of the bottom 31a of the drum member 31 and the front surface of the third ring gear R3. The coupling part 41 does not need to be provided along the entire circumference of the drum member 31. The drum member 31 may alternatively be provided with coupling parts 41 that extend circumferentially and are disposed at a plurality of circumferential positions on the drum member 31 (a plurality of circumferential positions on the third ring gear R3).

The bottom 31a of the drum member 31 has portions radially outside and inside the coupling part 41, and the portions each have, as low-rigidity parts, long holes 31c that extend circumferentially along the drum member 31, penetrate the bottom 31a, and are disposed at a plurality of circumferential positions on the drum member 31 (four positions in each of the portions in the present embodiment). If the long holes 31c positioned radially outside the coupling part 41 and the long holes 31c positioned radially inside are distinguished from each other hereinafter, the long holes 31c positioned radially outside will be referred to as outer long holes 31d and the long holes 31c positioned radially inside will be referred to as inner long holes 31e. These long holes will be simply called the long holes 31c when not being distinguished from each other.

The four outer long holes 31d are disposed circumferentially along the drum member 31 so as to be equally spaced apart from each other. The four inner long holes 31e are also disposed circumferentially along the drum member 31 so as to be equally spaced apart from each other. The four outer long holes 31d and the four inner long holes 31e according to the present embodiment are equally positioned circumferentially along the drum member 31. The present invention should not be limited to this case but the outer long holes 31d may alternatively be positioned between the inner long holes 31e adjacent to each other, circumferentially along the drum member 31. The outer long holes 31d may be different in the number from the inner long holes 31e.

In the case where the coupling parts 41 are provided at the plurality of circumferential positions, the outer long holes 31d may be equal in the number to the coupling parts 41 and may be positioned equally to the coupling parts 41 circumferentially along the drum member 31, or the outer long holes 31d may be positioned between the inner coupling parts 41 adjacent to each other, circumferentially along the drum member 31. The outer long holes 31d may be different in the number from the coupling parts 41. The inner long holes 31e are provided similarly to the outer long holes 31d.

The four outer long holes 31d are equal in length and width. The four inner long holes 31e are equal in length and width. The four outer long holes 31d are slightly longer than the four inner long holes 31e in the present embodiment, but may alternatively be as long as the four inner long holes 31e. The four outer long holes 31d are equal in width to the four inner long holes 31e, but may alternatively be different in width from the four inner long holes 31e.

The number, length, and width of each of the outer long holes 31d and the inner long holes 31e are determined such that vibration of the drum member 31 has a natural frequency set to a desired value.

Alternatively, the outer long holes 31d may not be provided and only the inner long holes 31e may be provided. In contrast, the inner long holes 31e may not be provided and only the outer long holes 31d may be provided.

The low-rigidity parts should not be limited to the long holes 31c but may alternatively be long grooves provided in either one of front and rear surfaces of the bottom 31a of the drum member 31. In this case, the long grooves are adjusted in terms of the number, length, width, and depth such that vibration of the drum member 31 has a natural frequency set to a desired value.

The third ring gear R3 has vibration when meshing with the plurality of pinions P3. This vibration is transmitted to the drum member 31 through the coupling part 41 (the projection welding coupling part) with almost no vibration damping. The vibration transmitted to the drum member 31 is transmitted to the transmission case 11 along with vibration of a different member provided in the transmission case 11 through various members provided in the transmission case 11. The vibration transmitted to the drum member 31 is transmitted to the transmission case 11 through the friction plates 32 and 33 when the second brake 24 is tightened. The drum member 31 of the second brake 24 is positioned adjacent to the transmission case 11, so that the vibration transmitted to the drum member 31 generates sound radiation that vibrates the transmission case 11 through air. The vibration transmitted to the transmission case 11 is to be transmitted to a vehicle interior through a vehicle body member (e.g. left and right front side frames) supporting the transmission case 11. When the drum member 31 has no long hole 31c in the automatic transmission 10 according to the present embodiment, vibration of particularly the drum member 31 in the automatic transmission 10 significantly influences vibration and noise generated in the vehicle interior. When the drum member 31 has no long hole 31c, a crew in the vehicle interior receives uncomfortable vibration and noise.

The drum member 31 according to the present embodiment is provided with the long holes 31c serving as the low-rigidity parts, the long holes 31c damp vibration transmitted from the third ring gear R3 to the drum member 31, so as to reduce vibration of the drum member 31 as well as vibration and noise generated in the vehicle interior. The long holes 31c enable weight reduction as well as inhibition of cost increase of the drum member 31. The long holes 31c are adjusted in the number, length, and width such that vibration of the drum member 31 has a natural frequency set to a desired value.

FIG. 7 indicates frequency characteristics of sound generated in the vehicle interior by vibration of the entire transmission case 11 in each of the case where the drum member 31 has the long holes 31c and the other case where the drum member 31 has no long hole 31c. The third ring gear R3 is in a tightened state in this case.

As apparent from FIG. 7, provision of the long holes 31c (the outer long holes 31d and the inner long holes 31e) in the drum member 31 leads to entire decrease in sound pressure level in comparison to the case where the long holes 31c are not provided. In particular, sound pressure levels uncomfortable to the crew in the vehicle interior, such as about 2200 Hz and about 3500 Hz, are decreased in peak value.

When the drum member 31 has the long holes 31c, a natural frequency of about 1400 Hz, which has a peak in the case where no long hole 31c is provided, shifts to about 1800 Hz.

In the second brake 24 according to the present embodiment, the bottom 31a of the drum member 31 has the portions radially outside and inside the coupling part 41, and the portions each have, as the low-rigidity parts, the long holes 31c (the outer long holes 31d and the inner long holes 31e) that are disposed at the plurality of circumferential positions on the drum member 31. This configuration achieves weight reduction and inhibition of cost increase of the drum member 31 coupled to the third ring gear R3 as well as vibration reduction at the drum member 31. This reduces vibration and noise generated in the vehicle interior due to vibration of the entire transmission case 11. Furthermore, the vibration of the drum member 31 has a natural frequency that can be set to a desired value.

The present invention should not be limited to the above embodiment but can have substitution within a range not departing from the gist of the claims.

The above embodiment exemplifies the case where the present invention is applied to the drum member 31 of the second brake 24 (the vehicle start friction tightening element). The present invention is applicable to any friction tightening element including the drum member coupled to the transmission path constituent member. For example, the present invention may be applicable to the drum member 6 (coupled to the first ring gear R1 and the second sun gear S2) of the second clutch 21, or the drum member 7 (coupled to the second ring gear R2) of the third clutch 22.

The embodiment described above is merely exemplary, and the scope of the present invention should not be interpreted in a limited manner. The scope of the present invention should be defined by the claims, and any modification and changes within a range equivalent to the claims should be entirely included in the scope of the present invention.

INDUSTRIAL APPLICABILITY

The present invention is useful to a power transmission device in an automatic transmission, the automatic transmission including a friction tightening element including a drum member, and a transmission path constituent member coupled to the drum member via a coupling part extending circumferentially along the drum member, and constituting part of a power transmission path of the automatic transmission.

DESCRIPTION OF REFERENCE CHARACTERS

10 Automatic Transmission
24 Second Brake (Vehicle Start Friction Tightening Element)
31 Drum Member
31c Long Hole (Low-Rigidity Part)
41 Coupling Part
R3 Third Ring Gear (Transmission Path Constituent Member)

The invention claimed is:

1. A power transmission device in an automatic transmission, the power transmission device comprising:
    a friction tightening element including a drum member having a bottomed cylindrical shape; and
    a transmission path constituent member coupled to a bottom of the drum member via a coupling part extending circumferentially along the drum member, and constituting part of a power transmission path of the automatic transmission, wherein
    the bottom of the drum member has low-rigidity parts that are provided at a plurality of circumferential positions on the drum member in respective portions radially outside and inside the coupling part, the low-rigidity parts being configured to reduce vibration of the drum member, and
    the low-rigidity parts are configured as long holes that extend circumferentially along the drum member and penetrate the bottom.

2. The power transmission device of claim 1, wherein
    the friction tightening element is a brake configured to fix the transmission path constituent member to a transmission case when the friction tightening element is tightened.

3. The power transmission device of claim 2, wherein
    the transmission path constituent member is a ring gear in a planetary gear set, and the coupling part is a welding coupling part.

4. The power transmission device of claim 1, wherein
    the automatic transmission is directly connected to a driving source, not via any torque converter, and the friction tightening element is a vehicle start friction tightening element configured to be tightened when a vehicle mounting the automatic transmission starts.

5. The power transmission device of claim 1, wherein outer long holes that are long holes provided radially outside the coupling part are equal in length circumferentially and equal in width radially, inner long holes that are long holes provided radially inside the coupling part are equal in length circumferentially and equal in width radially, and the outer long holes are circumferentially longer than the inner long holes.

6. The power transmission device of claim 5, wherein the outer long holes are disposed circumferentially so as to be equally spaced apart from each other, the inner long holes are disposed circumferentially so as to be equally spaced apart from each other, and the outer long holes and the inner long holes are equally positioned circumferentially.

\* \* \* \* \*